United States Patent [19]
Wicker

[11] 3,773,705
[45] Nov. 20, 1973

[54] THERMOPLASTIC MOULDING COMPOSITIONS REINFORCED WITH A MIXTURE OF GLASS AND ASBESTOS FIBERS

[75] Inventor: George Leonard Wicker, Milnrow, England

[73] Assignee: Turner Brothers Asbestos Company Limited, Manchester, England

[22] Filed: Nov. 12, 1971

[21] Appl. No.: 198,410

[30] Foreign Application Priority Data
Nov. 18, 1970 Great Britain.................... 54,899/70
Dec. 10, 1970 Great Britain.................... 58,746/70

[52] U.S. Cl. .......... 260/37 N, 260/41 AB, 260/41.5
[51] Int. Cl. ............................................ C08g 51/10
[58] Field of Search ...................... 260/41 AG, 37 N

[56] References Cited
UNITED STATES PATENTS

| | | | |
|---|---|---|---|
| 2,667,465 | 6/1954 | Nebesar................................ | 260/40 |
| 3,437,550 | 4/1969 | Paul....................................... | 161/93 |
| 3,396,142 | 8/1968 | Auburn.................................. | 260/41 |
| 3,461,094 | 8/1969 | Wesch ................................... | 260/41 |

FOREIGN PATENTS OR APPLICATIONS
1,010,043  1965  Great Britain

OTHER PUBLICATIONS

Handbook of Reinforced Plastics, Oleesky, "Asbestos Reinforced Plastics," pp. 167-179, 1965, U.S.P.O. Sci. Lib.

*Primary Examiner*—Morris Liebman
*Assistant Examiner*—Richard Zaitlen
*Attorney*—Richard C. Sughrue et al.

[57] ABSTRACT

Thermoplastic compositions comprise a thermoplastic polymer and are reinforced by a mixture of asbestos fibres and glass fibres. The compositions may be granular moulding compositions or moulded articles.

5 Claims, No Drawings

THERMOPLASTIC MOULDING COMPOSITIONS REINFORCED WITH A MIXTURE OF GLASS AND ASBESTOS FIBERS

In the last few years a considerable amount of work has been done on the production of articles of thermoplastic polymeric material reinforced by reinforcing fibres. Such articles are made by moulding a granular moulding composition comprising the thermoplastic polymeric material and the fibers. In all commercially available thermoplastic granular moulding compositions the reinforcing fibres usually consist either of glass fibres or of asbestos fibres.

It has long been known that articles can be formed of reinforced thermoset polymeric materials and for many years it has been recognised that suitable reinforcements are asbestos fibres and glass fibres, and proposals have been made to reinforce thermoset materials with mixtures of asbestos and glass fibres. Accordingly there are references in the literature to reinforcing polymeric materials with mixtures of asbestos and glass but in practice the only polymeric materials which have been reinforced by both glass and asbestos, in the same article, are thermosetting materials. In some instances a layer of thermosetting material reinforced by one type of fibre is built up over a layer of a thermosetting material reinforced by another type of fibre, for example in the production of a pipe, but more usually the articles of thermosetting material reinforced with glass and asbestos fibres have been made by moulding a fluid composition of uncured thermosetting material in which is dispersed a mixture of glass and asbestos fibres.

The amounts of asbestos fibres in glass-asbestos mixtures that have been used previously have customarily been very low, for example about five percent by weight based on the total fibre reinforcement, and the fibre length has customarily been very short, the asbestos being grade 7 on the Canadian Classification. It has been well acknowledged that the combination of asbestos with glass in this way in thermosetting compositions may give advantages. Included amongst these advantages are the fact that the presence of a small amount of short asbestos fibres considerably improves the smoothness of the resultant article and improves the flow properties of the fluid composition prior to curing. Although the inclusion of asbestos offers several advantages it does result in some deterioration in the mechanical properties of the final product.

Apart from the saving in cost, the known advantages in the addition of asbestos to glass as a reinforcement are only applicable when the polymeric material is thermosetting. For example it is only thermosetting moulding compositions that require the inclusion of asbestos to improve their flow properties, i.e., to act as thickeners. Thus it would be expected that an additive, i.e., grade 7 asbestos, that was useful for, for example, improving the flow properties of thermosetting compositions would have a deleterious effect upon the flow properties of a thermoplastic composition.

Accordingly it would be expected that the inclusion of asbestos in glass reinforced thermoplastic moulding compositions in the general way known for thermosetting compositions would result in the known disadvantages of the use of asbestos in glass reinforced plastics, possibly with other disadvantages, and without offering any significant advantages. Perhaps as a result of this we believe that thermoplastics have never been reinforced with both glass and asbestos fibres.

We have now surprisingly found that the combination of asbestos fibres with glass fibres can give a striking and totally unexpected improvement in the properties of reinforced thermoplastic articles.

Thermoplastic compositions according to the invention comprise at least 20 percent by weight thermoplastic polymeric material and at least 10 percent by weight, based on the composition, of a mixture of glass fibres and asbestos fibres in a proportion between 9:1 and 1:9. Such compositions are usually initially formulated as granular moulding compositions which are subsequently moulded into shaped articles.

Moulded articles formed in accordance with the invention generally contain from 50 to 90 percent, and most preferably from 60 to 80 percent, especially 65 to 80 percent, by weight polymeric material and 20 to 50 percent, preferably 20 to 40 percent and most preferably 20 to 35 percent by weight fibres based on the total composition. Preferably therefore the granular moulding composition also contains such amounts of polymeric material and fibres. The compositions may include fillers and other additives, usually in an amount of 0–20 percent based on the polymer.

Throughout this specification all parts and percentages are by weight.

The optimum proportions for any particular article may depend upon the properties required of the article and the moulding conditions available and this means that a moulder may from day to day require to produce articles of differing fibre and polymer contents. It is inconvenient for a moulder to hold stocks of granules of different polymer content and so may choose to have a concentrate containing only a small proportion, for example, 20 to 50 percent by weight, of the polymeric material and with which he may mix polymeric granules to form the composition that is actually to be moulded. In effect therefore he has a concentrate which he dilutes in accordance with his requirements, and the concentrate contains all the fibres, and any other fillers and other additives, required in the composition that is actually moulded.

It is known that the tensile modulus of most thermoplastic materials is very low, of glass fibres is moderate and of asbestos fibres, especially crysotile asbestos fibres, is very high. For example the values for polystyrene, glass and crysotile are, respectively, 2.7, 69 and 159 $GN/m^2$. Thus the polymeric matrix deforms under stress while the fibres carry the bulk of the stress. Accordingly it could be expected that the asbestos fibres would carry the major portion of applied stresses with only a minor proportion being carried by the glass fibres. As a result it could be expected that the strength of an article reinforced by a given amount of asbestos in the presence also of glass fibres would be little better than the strength of an article reinforced by the same amount of asbestos fibres alone, in the absence of glass.

Although this hypothesis reflects the view that we take, an alternative view could be advanced, namely that the total expected increase in strength obtained when a thermoplastic article is reinforced by given amounts of gass and asbestos fibres together is the sum of the increase in strength obtained when the thermoplastic is reinforced by the same amount of glass in the absence of asbestos and by the same amount of asbestos in the absence of glass. For example, the tensile strength and flexural strength of unreinforced polystyrene are 44.5 and 69.0 MN/m² respectively. The increase is these values obtained when the polystyrene is reinforced with 10 percent glass alone is 10.0 and 23.7 MN/m² respectively. The increase when the polystyrene is reinforced with 10 percent asbestos alone is 3.5 and 2.2 MN/m². Accordingly, the value expected for polystyrene reinforced with 10 percent glass and 10 percent asbestos would be 58.0 and 95.6 MN/m² respectively.

In practice we find that many compositions according to the invention have values considerably in excess of those that would be predicted even upon this second hypothesis. For example polystyrene reinforced with 10 percent glass and 10 percent asbestos has a tensile strength of 70.7 MN/m² and a flexural strength of 114.4 MN/m².

Thus we have found surprisingly that many compositions within the scope of the invention exhibit synergistic improvement in their tensile strength, their flexural strength, their tensile modulus or their flexural modulus compared to the values predicted by addition as described above. The preferred compositions at least exhibit synergism in their tensile strength and/or in their flexural strength.

This exhibition of synergism is totally unexpected and we are unaware of anything in the known properties of reinforced thermosetting compositions that could lead one to expect it.

Not every composition reinforced with a mixture of glass fibres and asbestos fibres in proportions of 9:1 to 1:9 exhibits synergism in this way. For example while good synergism may be obtained with one particular set of fibre contents for one polymer this same set of proportions may give rather weak synergism, or no synergism at all, if a different polymer is used.

The proportions of glass:asbestos are usually from 9:1 to 1:5, and are preferably from 3:1 to 1:3, often 7:3 to 3:7. If impact strength is an important consideration it is generally preferred that there should be less asbestos fibres than glass fibres, in which event preferred proportions asbestos:glass may be 1:9 to 1:1, especially 1:9 to 1:3.

The amount of fibre reinforcement in the article does have a significant effect upon the degree of synergism obtained and best results are usualy obtained when the amount of fibres is 20 to 40 percent by weight based on the total weight of composition. The most satisfactory results are generally obtained when the amount is about 30 percent, for example, 25 to 32 percent.

The asbestos fibres used in the invention are preferably crysotile asbestos fibres. These may be used alone or in admixture with other asbestos fibres. Other suitable asbestos fibres that may be used alone or in admixture with each other or with crysotile fibre are amphibole type fibres such as anthophyllite, amosite, tremolite and crocidolite fibres. The fibres used are usually of grades 4, 5, 6 or 7 on the Canadian Classification or mixtures thereof. The Canadian Classification is described at pages 24, 25 and 78 of "Asbestos" by C.Z. Carroll-Porczynski, published by Textile Institute 1956. The average fibre length of grade 4 fibres is about 3 mm, of grade 5 fibres is about 2.0 mm, of grade 6 fibres is about 1.25 mm and of grade 7 fibres is 0.25 mm − 0.75 mm. Preferably the fibres are of grades 4, 5 or 6 of mixtures of these, optionally also with grade 7 fibre, the fibres of grades 4, 5 and 6 preferably constituting the predominant proportion of such mixtures, e.g., at least 50 percent and preferably at least 80 percent of the asbestos fibres.

The glass fibres used in the invention are preferably of the type known as 'E' glass in the form of bundles of filaments of individual diameters of from 7 to 15 micrometres. The bundles are used either as continuous lengths of glass rovings or chopped into lengths of between 3 mm and 12.5 mm. Typical fibre lengths in granules of the extruded compound are from 0.25 mm to 12.5 mm and in articles moulded from the granules, 0.25 to 2.5 mm.

Normally the glass fibres are dressed with keying agents to improve the bonding to the polymer. Examples of such keying agents are methacrylate cyromic chloride and the substutited silanes with substituent groups capable of reaction with the glass surface and other substituent groups compatible with the matrix polymers; typical substituted silanes are vinyl triethoxysilane, γ aminopropyl triethoxy silane and glycidoxy propyl trimethoxy silane.

The thermoplastic polymeric material used in the invention can be any thermoplastic suitable for use in fibre reinforced moulding compositions and which can satisfactorily be compounded with asbestos fibres as a stable and usable composition. Examples are polyamides; polystyrene; copolymers of styrene with butadiene and styrene with acrylonitrile; copolymers and mixtures of polymers and copolymers containing styrene, butadiene and acrylonitrile; polyolefins such as polyethylene, polypropylene and copolymers of polyethylene and polypropylene; polysulphones; polyacetals; polyphenylene oxide and modified polyphenylene oxide compositions. A suitable polypropylene is isotactic polypropylene. A suitable polyethylene is high density polyethylene. The preferred polymers are polyamides, and most especially Nylon 6 (poly-ϵ-caprolactam), Nylon 6.6 (polyhexamethylene diamine adipamide) and Nylon 11 (poly-11-amino undecanoic acid lactam).

Examples of additional fillers or other additives that may be present include pigments, stabilisers, flow modifiers and particulate fillers to provide improved surface finishes or to modify the moulding behaviour. Such additives preferably do not exceed 20 percent by weight of the polymeric matrix. The particulate fillers may be talc, kaolin, china clay, silica flour, chalk, dolomite, or mixtures of any of these.

The granular moulding composition should comprise a substantially uniform mixture of polymeric material with an intimate mixture of the asbestos and glass fibres. Suitable mixing of the polymer and the two types of fibres, and any other additive that is to be present, can be effected in any convenient way. Thus asbestos fibres, glass fibres and polymeric material may be charged to a suitable compounding apparatus and compounded into granules containing all three components. In another method asbestos reinforced polymer and glass fibres are charged to suitable compounding apparatus, optionally together with further polymeric material. In another method glass reinforced polymer is charged with asbestos fibres, optionally with further polymeric material, to suitable compounding apparatus. In another method asbestos reinforced polymer and glass reinforced polymer are charged to suitable apparatus and compounded together. In all these methods the compounding is preferably conducted above the softening point of the polymer. It is then convenient to convert the reinforced product into granules by extruding the softened mix and granulating the extruded product, for example by chopping it.

Any additives, such as fillers, pigments and so forth that are to be present in the final article are generally included with the fibre reinforcement during the compounding step. The particles of the granular composition generally have a minimum dimension of at least 1 mm and a maximum dimension of no more than 8 mm. For example they may be rod shaped with a length of 1 to 8 mm and a diameter or width of 1 to 4 mm. Preferred dimensions are from 2 to 3 mm.

Reinforced articles may be made by moulding, for example by injection moulding or by other moulding processes, a granular composition containing all the polymeric material and fibrous reinforcement that is desired. However as mentioned it is also possible to use a concentrate containing the glass and asbestos and some of the polymer required in the final article and to mix this prior to or during the moulding step with the remainder of the polymeric material that is required.

Typical articles that may be made by moulding granular compositions of the invention include housings, e.g., for instruments and domestic equipment, radio and television cabinets, photographic equipment, dashboard panels, gears and bearings and electrical components such as switches, plugs and control gear.

The following are some examples of the invention. In these the asbestos fibres is, unless otherwise stated, chrysotile asbestos fibres classifed as grade 4 on the Canadian Classification. The method used for determining melt flow index is BS 2782 (1970) Method 102H.

"Wingstay," which is used in many of the examples, is a trade mark for a polymeric hindered phenol condensation product made by Goodyear Tire and Rubber Co. of Akran, Ohio, U.S.A.

Example 1

700 grams of polyethylene granules, referred to below as "type I", having a density of 924 kg/m$^3$ and a melt flow index of 8.0, was mixed in a high-speed mixer with stabilisers as shown in composition A below. To the mix was added 300 grams of crysotile asbestos, classified as grade 4 by the Canadian Classification method. The asbestos fibre had a surface area of 100 dm$^2$g. The composition was mixed for a further 10 minutes in the high-speed mixer to produce a homogeneous blend of fibre, polymer and additives. This is designated as composition A. It was compounded in a compounder/extruder and the extrudate was granulated.

Another composition, B, was made in similar manner from 700 grams of type 1 polyethylene and 300 grams of glass fibre in the form of a chopped 152 tex, 408 filament strand of 6 mm fibre length. The glass fibre had been dressed with a polyvinyl acetate/γ methacryloxypropyl trimethoxy silane composition. The mix was compounded in an extruder and the extrudate was granulated.

Another composition, C, was made by mixing together, for 2 minutes in the high-speed mixer, 700 grams of type 1 polyethylene and the stabiliser system used in composition A. To the mix was added 250 grams of the asbestos described in composition A and mixing was continued for a further 10 minutes. At this stage, 50 grams of the glass fibre described in composition B was added and mixed in a low-speed mixer for 15 minutes. Composition C was then ompounded in an extruder/compounder and granulated to form a moulding composition.

Compositions A, B and C were injection moulded to product tensile and flexural strength test pieces. Details of the compositions and strength results are given below in Table I.

TABLE I

| Materials used: | Composition | | |
|---|---|---|---|
| | 1A | 1B | 1C |
| Glass fibre | | 300 | 50 |
| Asbestos fibre | 300 | | 250 |
| Polyethylene, type I | 700 | 700 | 700 |
| Wingstay L | 0.5 | | 0.4 |
| Dilauryl-thiodipropionate | 0.5 | | 0.4 |
| Melamine | 1.0 | | 0.8 |
| Tensile strength (MN/m.$^2$) | 24.0 | 17.5 | 27.5 |
| Flexural strength (MN/m.$^2$) | 33.0 | 23.5 | 33.5 |

Example 2

A different type, referred to below as "type II", polyethylene granules was formulated into compositions and test articles in the same general manner as in Example 1. The polyethylene had a density of 950 kg/m$^3$ and a melt flow index of 12.0.

Compositions 2A, 2B and 2C were injection moulded to produce tensile and flexural strength test pieces. Details of the compositions and strength results are given below in Table II.

TABLE II

| Materials used: | Composition | | |
|---|---|---|---|
| | 2A | 2B | 2C |
| Glass fibre | 100 | | 16.6 |
| Asbestos fibre | | 100 | 83.4 |
| Polyethylene, type II | 900 | 900 | 900 |
| Wingstay L | | 0.2 | 0.2 |
| Dilauryl-thiodipropionate | | 0.2 | 0.2 |
| Melamine | | 0.4 | 0.4 |
| Tensile strength (MN/m.$^2$) | 19.8 | 27.2 | 27.7 |
| Flexural strength (MN/m.$^2$) | 25.9 | 41.5 | 42.7 |

Example 3

Compositions 3A and 3B (described below) were formulated in the general manner described for Compositions 1A and 1B in Example 1.

Composition 3C was made by mixing, in a low-speed mixer, 838 grams of composition 3A, 95 grams of type II polyethylene granules, 67 grams of the glass fibre and stabilisers. The mix was compounded in a single screw extruder and the extrudate was granulated.

Composition 3D was made by slow-speed mixing of 300 grams of polyethylene type II granules, 502 grams of composition 3A and 200 grams of the glass fibre. The mix was compounded in a single screw extruder and the extrudate was granulated.

Compositions 3A, 3B, 3C and 3D were injection moulded to produce tensile and flexural strength test pieces.

The compositions and strength results are given below in Table III.

TABLE III

| | Composition | | | |
|---|---|---|---|---|
| | 3A | 3B | 3C | 3D |
| Glass fibre | | 400 | 67 | 200 |
| Asbestos fibre | 400 | | 335 | 200 |
| Polyethylene, type II | 600 | 600 | 598 | 600 |
| Wingstay L | 0.5 | | 0.3 | 0.3 |
| Dilauryl-thiodipropionate | 0.5 | | 0.3 | 0.3 |
| Melamine | 1.0 | | 0.5 | 0.5 |
| Tensile strength (MN/m.$^2$) | 39.3 | 28.5 | 44.7 | 46.0 |
| Flexural strength (MN/m.$^2$) | 66.2 | 43.4 | 74.7 | 69.6 |

Example 4

Compositions 4A and 4B were prepared in the same general manner as Composition 1A and 1B. The polymer used was general purpose polystyrene microbeads. The glass fibre was made from 152 tex, 408 filament glass roving dressed with an alkyd resin and 3, 4, epoxy cyclohexyl ethyl trimethoxy silane, chopped to lengths of 6 mm.

Composition 4C was made by slow-speed mixing of 667 grams of Composition 4A, 66.5 grams of the glass fibre and 267 grams of polystyrene micro-beads, followed by compounding in a single screw extruder and the extrudate was granulated.

Compositions 4A, 4B and 4C were injection moulded to produce tensile and flexural strength test pieces. Details of the compositions and strength results are given in Table IV.

TABLE IV

|  | Composition | | |
|---|---|---|---|
|  | 4A | 4B | 4C |
| Materials used: | | | |
| Glass fibre |  | 200 | 66.5 |
| Asbestos fibre | 200 |  | 133.0 |
| Polystyrene microbeads | 800 | 800 | 800.5 |
| Tensile strength (MN/m.²) | 69.1 | 69.1 | 72.7 |
| Flexural strength (MN/m.²) | 111.9 | 108.2 | 117.0 |

Example 5

Compositions 5A and 5B were prepared in the same general manner as Compositions 1A and 1B. The polymer used was powdered polypropylene homopolymer and stabilisers. The glass fibre was dressed with polybutene and 3, 4 epoxycyclohexyl ether trimethoxy silane.

Composition 5C was made by slow-speed mixing of 300 grams of powdered polypropylene homopolymer, 200 grams of the glass fibre and 500 grams of composition 5A. The mix was compounded in a single screw extruder and the extrudate was granulated.

Compositions 5A, 5B and 5C were injection moulded to produce tensile and flexural strength test pieces. Details of the compositions and strength results are given in Table V.

TABLE V

|  | Composition | | |
|---|---|---|---|
|  | 5A | 5B | 5C |
| Materials used: | | | |
| Glass fibre |  | 400 | 200 |
| Asbestos fibre | 400 |  | 200 |
| Powdered polypropylene homopolymer | 600 | 600 | 600 |
| Wingstay L | 5 |  | 2.5 |
| Dilauryl-thiodipropionate | 5 |  | 2.5 |
| Melamine | 10 |  | 5.0 |
| Tensile strength (MN/m.²) | 47.0 | 35.7 | 55.3 |
| Flexural strength (MN/m.²) | 78.8 | 71.2 | 80.1 |

Example 6

Compositions 6A, B, C and D were made by the same general method as Compositions 1A and 1B. The polymer was styrene/acrylonitrile copolymer having a melt flow index of 10.0. The glass fibres were the same as in Example 4.

Composition 6E was made by the slow-speed mixing of 250 grams of composition 6A, 225 grams of the glass fibre and 525 grams of the styrene/acrylonitrile copolymer. The mix was compounded in a single screw extruder and the extrudate was granulated.

Composition 6F was made by mixing together, in a slow-speed mixer, 500 grams of composition 6A, 167 grams of composition 6B and 333 grams of the styrene/acrylonitrile copolymer. The mix was moulded in an injection moulding machine to produce tensile and flexural strength test pieces.

Composition 6G was made by mixing together, in a slow-speed mixer, 500 grams of composition 6E and 250 grams of the styrene acrylonitrile copolymer. The mix was moulded in an injection moulding machine to produce tensile and flexural strength test pieces.

Compositions 6A, B, C, D and E were also injection moulded to produce tensile and flexural strength test pieces.

Details of the compositions and the strength results are given in Table VI.

TABLE VI

|  | Composition | | | | | | |
|---|---|---|---|---|---|---|---|
|  | 6A | 6B | 6E | 6C | 6D | 6F | 6G |
| Materials used: | | | | | | | |
| Glass fibre |  | 300 | 225 |  | 200 | 50 | 50 |
| Asbestos fibre | 300 |  | 75 | 200 |  | 150 | 150 |
| Styrene/acrylonitrile | 700 | 700 | 700 | 800 | 800 | 800 | 800 |
| Tensile strength (MN/m.²) | 66.1 | 84.6 | 87.0 | 65.8 | 83.8 | 83.1 | 85.0 |
| Flexural strength (MN/m.²) | 150.8 | 177.3 | 179.2 | 105.3 | 134.8 | 124.4 | 136.2 |

Example 7

Compositions 7A and B were made by the same general method as Compositions 1A and 1B but using as the polymer 6.6 nylon (moulding grade) granules.

Composition 7C was made by the slow-speed mixing of 700 grams of composition 7A and 300 grams of composition 7B.

Compositions 7A, 7B and 7C were injection moulded to produce tensile and flexural strength test pieces. Details of the compositions and strength results are given in Table VII.

TABLE VII

|  | Composition | | |
|---|---|---|---|
|  | 7A | 7B | 7C |
| Materials used: | | | |
| Glass fibre |  | 100 | 30 |
| Asbestos fibre | 100 |  | 70 |
| 6.6 nylon moulding grade polymer | 900 | 900 | 900 |
| Tensile strength (MN/m.²) | 96.5 | 92.0 | 97.2 |
| Flexural strength (MN/m.²) | 133.2 | 130.6 | 137.6 |

Example 8

Compositions 8A and 8B were made by the same general method as compositions 1A and 1B. The polymer was moulding grade nylon 6 granules. The glass fibre was dressed with polyvinyl acetate and γ amino propyl triethoxy silane.

Composition 8C was made by the slow-speed mixing of 65 grams of composition 8A and 350 grams of composition 8B. The mix was compounded in a single screw extruder and the extrudate was granulated.

The compositions, 8A, 8B and 8C were injection moulded to produce tensile and flexural strength test pieces. Details of the compositions and strength results are given in Table VIII.

TABLE VIII

|  | Composition | | |
|---|---|---|---|
|  | 8A | 8B | 8C |
| Materials used: | | | |
| Glass fibre | | 200 | 70 |
| Asbestos fibre | 200 | | 130 |
| Nylon 6 moulding granules | 800 | 800 | 800 |
| Tensile strength (MN/m.²) | 97.1 | 84.9 | 105.4 |
| Flexural strength (MN/m.²) | 181.0 | 157.5 | 192.5 |

Example 9

Composition 9A was made by feeding 700 grams of injection moulding grade nylon 6 granules and 300 grams of crysotile asbestos fibre into the feed pocket of a twin-screw compounding extruder. The extrudate was granulated.

Composition 9B was made by feeding 700 grams of injection moulding grade nylon 6 granules to the feed pocket of a twin-screw compounding extruder and feeding 300 grams of continuous glass, dressed with polyvinyl acetate and γ-aminopropyl triethoxy silane, into the molten polymer via a vent port in the barrel of the twin-screw compounding extruder. The resultant extrudate was granulated.

Composition 9C was made by feeding 700 grams of injection moulding grade nylon 6 granules and 160 grams of the chrysotile asbestos fibre to the feed pocket of a twin-screw compounding extruder. 140 Grams of the continuous glass roving were then fed into the softened asbestos/nylon 6 mix, via a vent port in the barrel of the extruder and the resultant extrudate was granulated.

Compositions 9A, 9B and 9C were injection moulded to produce tensile and flexural strength test pieces. Details of the compositions and strength results are given in Table IX.

TABLE IX

|  | Composition | | |
|---|---|---|---|
|  | 9A | 9B | 9C |
| Materials used: | | | |
| Glass fibre | | 300 | 140 |
| Asbestos fibre | 300 | | 160 |
| Nylon 6 moulding granules | 700 | 700 | 700 |
| Tensile strength (MN/m.²) | 122.0 | 121.7 | 128.5 |
| Flexural strength (MN/m.²) | 208.0 | 212.0 | 221.0 |

Example 10

To illustrate the effect of the glass/asbestos ratio, two series of mixed fibre reinforced nylon 6 compounds were prepared by the general method of Example 9, with varying glass to asbestos fibre ratios and at two levels of total fibre content. Flexural strength tests were carried out on injection moulded test pieces and the results are shown in Table X below.

TABLE X

| Glass:asbestos | Total reinforcement, percent | Flexural strength |
|---|---|---|
| 100:0 | 20 | 157.5 |
| 83.3:16.7 | 20 | 170.0 |
| 75:25 | 20 | 174 |
| 66.7:33.3 | 20 | 176.5 |
| 50:50 | 20 | 183.2 |
| 33.3:66.7 | 20 | 192.5 |
| 25:75 | 20 | 186.9 |
| 16.7:83.3 | 20 | 184.6 |
| 0:100 | 20 | 181.0 |
| 100:0 | 30 | 168.6 |
| 83.3:16.7 | 30 | 198.0 |
| 75:25 | 30 | 227.1 |
| 66.7:33.3 | 30 | 228.2 |
| 50:50 | 30 | 231.5 |
| 33.3:66.7 | 30 | 220.2 |
| 25:75 | 30 | 212.1 |
| 16.7:83.3 | 30 | 212.3 |
| 0:100 | 30 | 196.4 |

Example 11

Composition 11A was made by the high-speed mixing of 800 grams of nylon 11 granules and 200 grams of a crystoile asbestos fibre classified as 6 grade by the Canadian classification method and with a surface area of 120 dm²/g. The mix was compounded in a single screw extruder. The extrudate was granulated.

Composition 11B was made by the slow-speed mixing of 800 grams of nylon 11 granules and 200 grams of chopped 6 mm length glass fibres dressed with polyvinyl acetate and amino propyl triethoxysilane. The mix was compounded in a single screw extruder and the extrudate was granulated.

Composition 11C was made by the high-speed mixing of 800 grams of nylon 11 granules and 130 grams of the asbestos fibre. The mix was then placed in a slow-speed mixer and mixed with 70 grams of the 6 mm length chopped glass fibre. The final mix was compounded in a single screw extruder and the extrudate was granulated.

Compositions 11A, 11B and 11C were injection moulded to produce tensile and flexural strength specimens. Details of the compositions and strength results are given in Table XI.

TABLE XI

|  | Composition | | |
|---|---|---|---|
|  | 11A | 11B | 11C |
| Materials used: | | | |
| Glass fibre | | 200 | 70 |
| Asbestos fibre | 200 | | 130 |
| Nylon 11 granules | 800 | 800 | 800 |
| Tensile strength (MN/m.²) | 69.0 | 69.0 | 89.6 |
| Flexural strength (MN/m.²) | 96.5 | 97.5 | 119.3 |

Example 12

200 parts of Nylon 6 moulding granules are mixed in a high speed mixer with 660 parts of the 4s grade chrysotile asbestos fibre. The resultant blend is fed to the feed pocket of a twin screw compounding extruder. 200 parts of 6 mm length E glass fibre, dressed with a size consisting of a mixture of polyvinyl acetate and γ-amino propyl triethoxy silane, is fed at a controlled rate into the compounded asbestos/Nylon 6 melt through a vent port at a distance along the barrel of the extruder and the resultant extrudate is granulated by chopping at the output die face. The resultant concentrate granules were mixed in the proportion of 1:3 with further Nylon 6 polymer granules in a tumbler mixer and moulded in an injection moulding machine to produce test pieces containing 20 percent total fibre reinforcement and a glass fibre/asbestos ratio of 1:3.

The flexural strength of the test pieces was 188 MN/m².

We claim:

1. A thermoplastic composition, comprising (i) from 60 to 90 percent by weight of a thermoplastic polymeric material selected from the group consisting of polyolefins, polystyrene, polyamides, copolymers of butadiene, copolymers of acrylonitrile and copolymers of styrene; (ii) at least 10 percent by weight, based on the total weight of the composition, of a mixture of glass fibres and asbestos fibres in a weight ratio of from 1:0.11 to 1:9; and (iii) from zero to 20 percent by weight based on the polymeric material of a component selected from the group consisting of fillers and additives other than glass fibres and asbestos fibres; said ratio of glass and asbestos fibers lending synergistic properties to the thermoplastic composition in at least one of the properties of tensile strength, flexural strength, tensile modulus and flexural modulus.

2. A thermoplastic composition according to claim 1, wherein the weight ratio of glass fibres to asbestos fibres is within the range from 1:1 to 1:9.

3. A thermoplastic composition according to claim 1, wherein the asbestos fibres comprise essentially asbestos of grades 4, 5 or 6 of the Canadian Classification.

4. A thermoplastic composition according to claim 1, in which the weight of said polymeric material is from 60 to 80 percent and in which the weight ratio of glass fibres to asbestos fibres is from 3:7 to 7:3.

5. A method of manufacturing a thermoplastic composition as claimed in claim 1 in the form of a granular moulding material, comprising compounding together (i), (ii) and (iii) as described in claim 1 at a temperature above the softening point of the polymeric material, extruding the resulting compounded composition and granulating the extrudate so formed.

* * * * *